No. 869,762. PATENTED OCT. 29, 1907.
L. C. WOERNER.
LIMIT MICROMETER GAGE.
APPLICATION FILED FEB. 5, 1907.
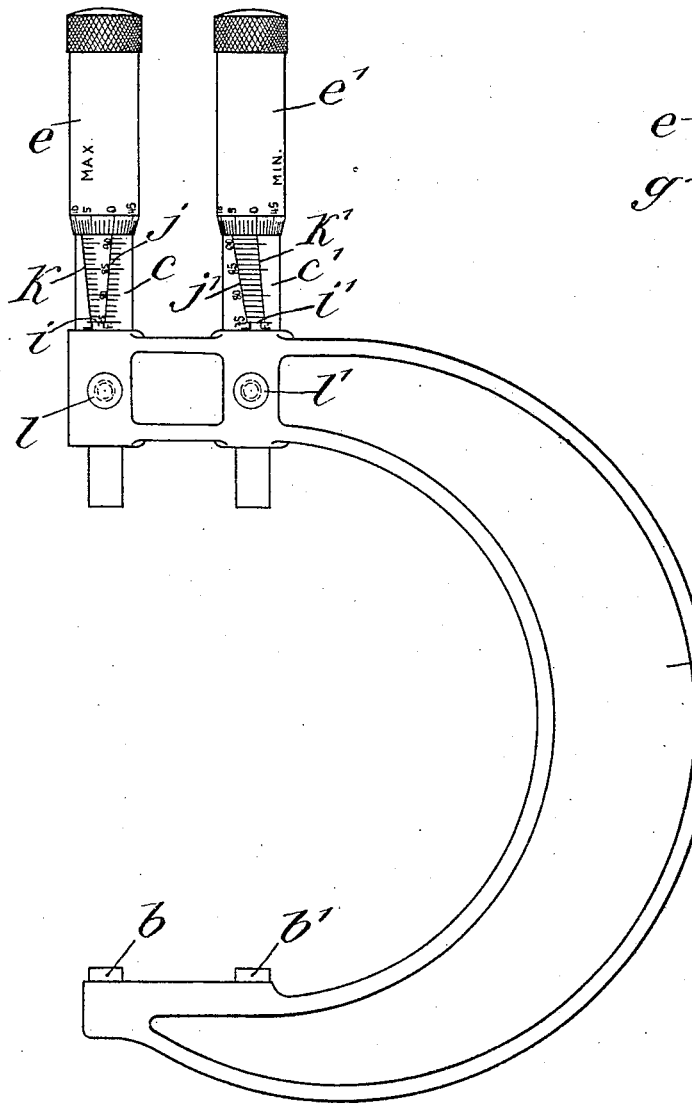
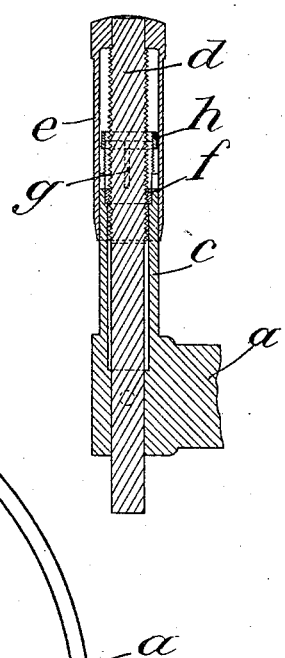
Witnesses
T. P. Britts
E. C. Duffy
Inventor
L. C. Woerner
By O. E. Duffy
Attorneys

UNITED STATES PATENT OFFICE.

LOUIS C. WOERNER, OF BERLIN, GERMANY.

LIMIT MICROMETER-GAGE.

No. 869,762.  Specification of Letters Patent.  Patented Oct. 29, 1907

Application filed February 5, 1907. Serial No. 355,790.

*To all whom it may concern:*

Be it known that I, LOUIS CHRISTIAN WOERNER, engineer, a citizen of the United States of North America, residing at 17/20 Huttenstrasse, Berlin, German Empire, have invented new and useful Improvements in Limit Micrometer-Gages, of which the following is a specification.

As is well known, the limits of a limit-gage must be adapted for the particular purpose for which the piece of work (shaft or the like) to be made is destined to serve. Thus, for instance, the limits of a gage for the manufacture of a shaft for an easy running fit, such as is the case, as a rule, with shafts having several bearings, can be greater than in the case of a gage which is used in making a shaft on which, for example, a toothed wheel or a pulley is to be keyed.

Hitherto it has been the practice to employ for each class of work a special limit gage, with limits adapted for the particular purpose in question.

The subject of my invention is an improvement in micrometer gages of allowance, which enables any such gage to be employed in the simplest manner as limit-gage both for keying and for running fits, that is to say, in the manufacture of shafts which are to make a running fit in the bearing or the like, as well as for shafts which are to make a keying fit. For this purpose the hollow shanks in which the two micrometer screws of the limit gage work are each provided with two fixed marks, in such manner that, according to the adjustment of the zero point or another division of the circular graduations to one of the marks corresponding to each other a limit gage can be constituted for the allowance for a keying or for a running fit of a shaft in its bearing or seat.

The invention is illustrated in the accompanying drawing, in which

Figure 1 is a side elevation, and Fig. 2 a section through one of the micrometer screws.

$a$ is the body of the gage of the well known C shape and preferably made of iron. At the one end of the body cheek pieces $b\ b^1$ of tempered steel are let in. Opposite these cheeks, at the other end, are shanks $c\ c^1$, formed in one piece with the body and containing the micrometer screws $d$, the outer of which is for setting the maximum limit and the inner for determining the minimum limit.

The outer of the two micrometer screws is shown in section in Fig. 2. $d$ is the threaded mandrel with which there is rigidly connected in well-known manner a hollow cap $e$, which fits over the shank $c$. $f$ is the nut which is fixed in the latter. The nut is provided with slits $g$ and has a thread on the outside to receive the adjusting collar $h$.

The shanks $c\ c^1$ are each provided with cross graduations $i\ i^1$. On the shank $c$ of the outer gage screw are two inclined lines $j\ k$, and on the shank $c^1$ of the other screw are two inclined lines $j^1\ k^1$, on which a longitudinally running scale is marked. The lines $j\ j^1$ determine the maximum and minimum limits in manufacturing of shafts for a running fit while by means of the lines $k\ k^1$ the maximum and minimum limits for manufacturing of shafts with a keying fit in their bearing are determined. If, for instance, a shaft of 90 mms. diameter is to be manufactured which has to make a keying fit in its bearing, the permissible limits are obtained by adjusting the micrometer screws to the corresponding cross division 90 with their zero division on the marks $k\ k^1$, and then tightening the set-screws $l\ l^1$. For obtaining the permissible limits in manufacturing a shaft of 90 mms. with a running fit in its bearing, the screws must be adjusted to the lines $j\ j^1$.

The provision of the marks $k\ k^1$, $j\ j^1$ thus enables, in very simple manner, the combination of limit gages for manufacturing shafts or the like with running or keying fit in a single instrument.

Having thus described my invention, I claim as new:

In a limit gage, two hollow shanks each provided with cross-graduations; a maximum screw working in the one shank and a minimum screw in the other, each screw having a hollow cap fitting over the respective shank and furnished with circular graduations; and two fixed inclined marks upon each of the said shanks, on which the longitudinally running micrometer scales are marked, one of the said fixed marks in combination with the corresponding mark on the other screw being intended for determining the limits of the gage for manufacturing shafts or the like with a running fit in their bearing and the other corresponding pair of marks on the screws determining the limits for manufacturing shafts or the like with a keying fit in their bearing, substantially as described.

In witness whereof I have hereunto signed my name this 5th day of January 1907, in the presence of two subscribing witnesses.

LOUIS C. WOERNER.

Witnesses:
 WOLDEMAR HAUPT,
 HENRY HASPER.